(12) United States Patent
Modell et al.

(10) Patent No.: US 7,862,894 B2
(45) Date of Patent: Jan. 4, 2011

(54) MATERIAL COMPOSITION AND METHOD FOR ITS MANUFACTURE

(75) Inventors: Jonas Modell, Simlångsdalen (SE); Staffan Thuresson, Gullbrandstorp (SE)

(73) Assignee: Ramlat Ltd., Msida (MT)

( * ) Notice: Subject to any disclaimer, the term of this patent is extended or adjusted under 35 U.S.C. 154(b) by 152 days.

(21) Appl. No.: 12/377,337

(22) PCT Filed: Aug. 15, 2007

(86) PCT No.: PCT/SE2007/000726

§ 371 (c)(1),
(2), (4) Date: Feb. 12, 2009

(87) PCT Pub. No.: WO2008/020800

PCT Pub. Date: Feb. 21, 2008

(65) Prior Publication Data

US 2010/0210785 A1     Aug. 19, 2010

(30) Foreign Application Priority Data

Aug. 17, 2006  (SE)  .................................. 0601696

(51) Int. Cl.
*B32B 25/02* (2006.01)

(52) U.S. Cl. ........................ 428/403; 428/404; 428/405; 524/588

(58) Field of Classification Search ........................ None
See application file for complete search history.

(56) References Cited

U.S. PATENT DOCUMENTS

| | | |
|---|---|---|
| 2,541,851 A | 2/1951 | Wright |
| 3,177,176 A | 4/1965 | Boot et al. |
| 4,863,985 A | 9/1989 | Pouchol et al. |
| 5,258,437 A | 11/1993 | Takeuchi et al. |
| 5,319,021 A | 6/1994 | Christy |
| 5,607,993 A | 3/1997 | Christy |
| 5,873,933 A | 2/1999 | Mackey |
| 5,916,949 A | 6/1999 | Shapero et al. |
| 6,502,935 B1 * | 1/2003 | Barcock et al. ............. 347/105 |
| 2008/0161493 A1 * | 7/2008 | Ghyzel et al. ................. 525/56 |

OTHER PUBLICATIONS

International Search Report for corresponding International Application PCT/SE2007/000726.
STN International, File CAPLUS, CAPLUS accession No. 2004:948484, document No. 142:220220, Xenon Technologies, Inc., "Preparation method of naturally-curing water-soluble clay for handicraft" & KR, A, 2003047136, 20030618.

* cited by examiner

*Primary Examiner*—Marc S Zimmer
(74) *Attorney, Agent, or Firm*—WRB-IP LLP

(57) ABSTRACT

A material composition for play or modelling purposes includes a particulate material and a binder which is disposed as thin layers on the particles. T-he binder includes a hydroxy-terminated polymer cross-linked by a boron compound, in particular a silicone oil. The concentration of particles is 90-98 vol % of the finished composition. A method for producing the material composition includes placing the particles in a mixer, adding the hydroxyl-terminated polymer, in particular silicone oil, and distributing it as thin layers on the surfaces of the particles and, thereafter, adding a boron-containing cross-linking agent in solution and mixing so that a cross-linking of the polymer takes place and the viscosity increases.

18 Claims, 2 Drawing Sheets

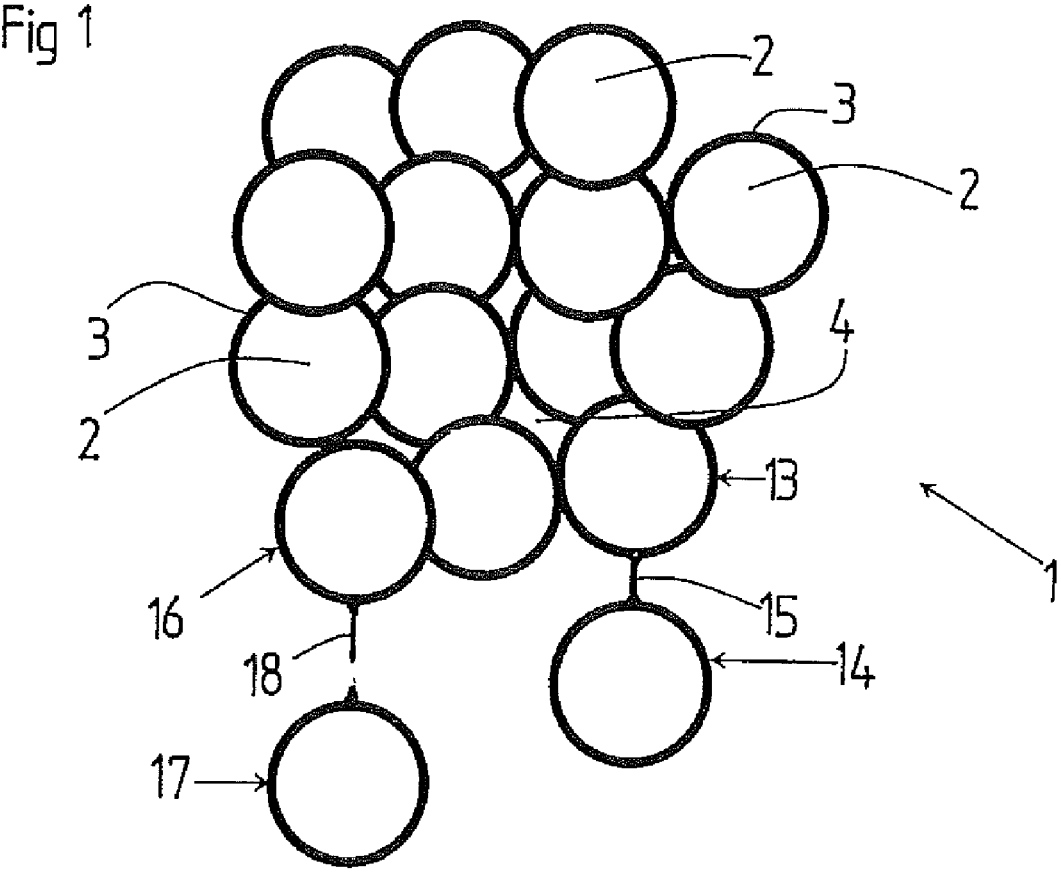

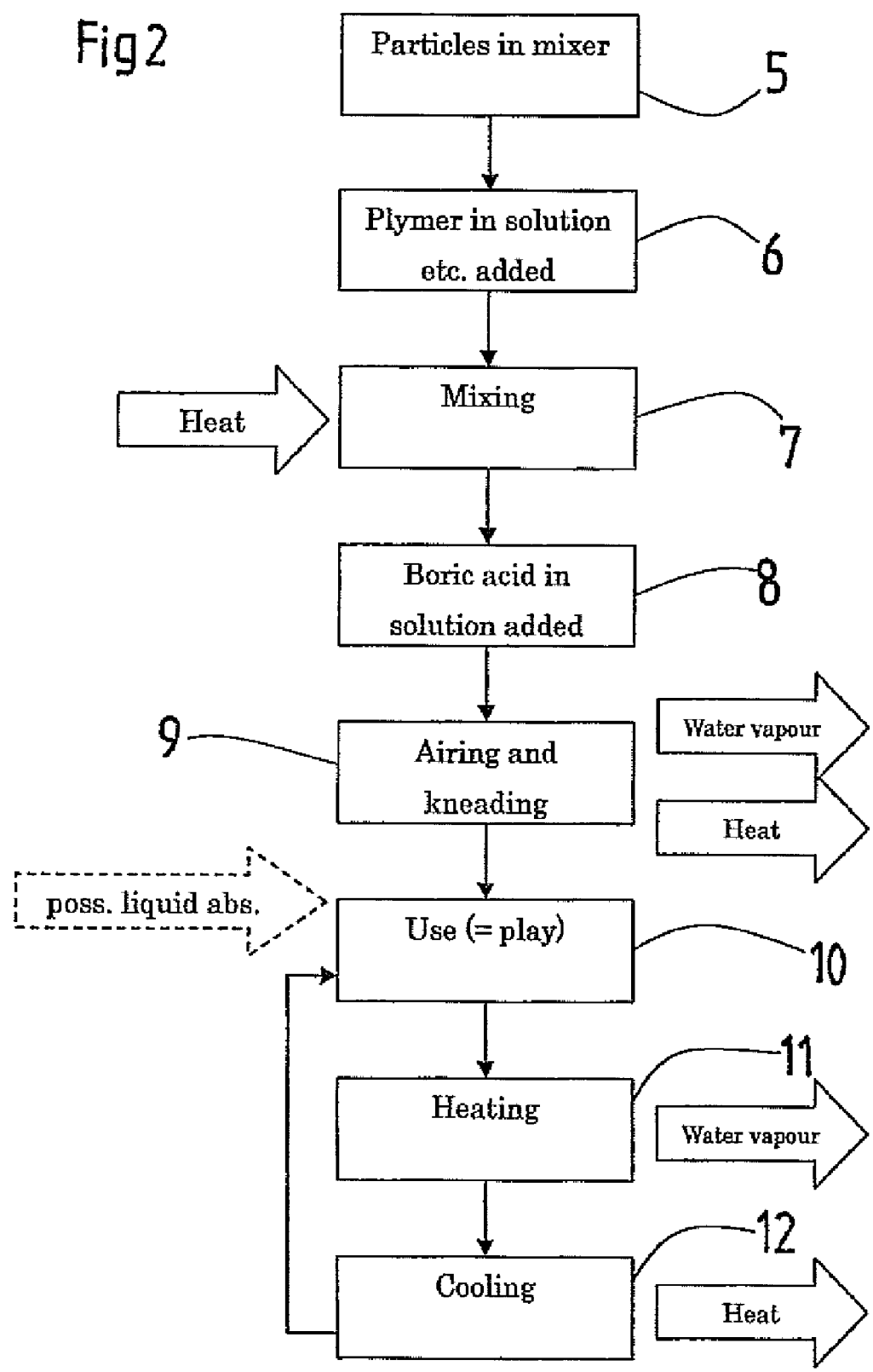

MATERIAL COMPOSITION AND METHOD FOR ITS MANUFACTURE

BACKGROUND AND SUMMARY

The present invention relates to a material composition, comprising on the one hand a particulate or granular material and, on the other hand, a binder which is disposed as a coating on the particles or the grains, the binder comprising a hydroxyl-terminated polymer cross-linked by a boron compound.

The present invention also relates to a method of producing a material composition, comprising the steps that a quantity of particles or grains is placed in a mixer; that at least one first ingredient included in the binder comprising a hydroxy-terminated polymer of low viscosity is supplied to the mixer; and that a second ingredient in the form of a cross-linking agent containing boron is supplied to the mixer.

Numerous model clays or similar kneadable materials are previously known in the art and are employed both for artistic purposes and also by children at play. It is a known fact that many of these materials require a certain working and gentle heating in order to obtain the desired plasticity and mouldability.

In order to be able to use the mouldable or formable matrix so as to make figures in moulds, it is necessary that the matrix releases or slips readily from the materials from which the moulds are made. The adhesive capacity of matrix or composition to its surroundings must therefore be limited, which also entails the effect that the matrix is, at the same time, perceived as less tacky and easy to handle.

Another problem which is relevant when the clay or the composition is handled by small children, in particular in the event of repeated use, is that bacteria and other contaminants may grow in the handled composition, which is unsuitable not least when the composition is handled in large children's groups, such as in the child care services. At the same time, the consistency of the modelling clay or the composition is reduced in that liquid, for example in the form of sweat or saliva, is absorbed by the composition.

One example of a material known in the art is so-called trick dough which consists mostly of flour, water and salt. Another similar material which includes further additives is marketed under the trademark Play-Doh®. These materials dry out when the water evaporates during use. In addition, the material does not slip or release from deep moulds of plastic or similar materials.

In order to obtain an interesting structure which is readily mouldable, it is possible to cause a relatively large proportion of particles to be included in the material which will then have a granular structure which, for example, may be likened to wet sand. Moreover, the total volume of the kneadable material increases at the same time, at least by the volume of the particles included.

One example of a prior art material which satisfies the above-outlined criteria at least as regards workability, reasonably low tackiness and the desired granular structure as a result of the particles included is the Applicant's own Application under serial number SE 0500663-0. However, this material has, in addition, specific properties in that it may be baked in an oven in order to produce hard figures that are moreover water-resistant. If a soft material is once again desired, the hard figures are heated up, whereafter the composition must be kneaded during cooling in order to become soft at room temperature. This latter working takes up a not inconsiderable amount of time and effort, which could be a drawback in certain circumstances, for example in the child care services where there is occasionally a shortage of personnel. A certain adhesion of the binder of the material occurs to normal plastics which are included in moulds and equipment, which may also be perceived as a drawback.

Another prior art material is described in U.S. Pat. No. 5,607,993 which discloses a so-called "bounce clay". In working, this material lacks a manifest particulate structure, nor is it immediately intended for figure moulding, but rather for use where its bouncing properties are appreciated. The bouncing clay contains a small proportion of particles which merely function as a filler with a view to imparting lower density to the bouncing clay. The particles are extremely small and are completely surrounded by the silicone material and their granular structure cannot therefore be sensed on handling of the composition. The "bouncing clay" is available in many different variations, and the chemical compositions are well-known as well as their effects on the properties of the material.

There is hence a need in the art to realise a composition principally for play and educational purposes where the property that the composition is readily mouldable and formable is combined with a low level of adhesion to its surroundings and an attractive and pleasant structure, but which is different from the materials already existing in the art.

According to an aspect of the present invention, the material composition intimated by way of introduction is characterised in that the concentration of the particulate or granular material is about 90-98 vol % of the finished composition.

According to another aspect of the present invention, in a method for producing the material composition, the first ingredient included in the binder is distributed as thin layers on the surfaces of the particles or grains, and that thereafter the cross-linking agent in dissolved form is supplied to the mixer for cross-linking the thin layers of the first ingredient.

BRIEF DESCRIPTION OF THE DRAWINGS

The present invention will now be described in greater detail hereinbelow, with reference to the accompanying Drawings. In the accompanying Drawings:

FIG. 1 is a magnification of a small quantity of the material composition, consisting of particles of binder, according to the present invention; and FIG. 2 is a block diagram relating to the manufacture and use, including cleaning, of the material composition according to the present invention.

DETAILED DESCRIPTION

FIG. 1 shows, in considerable magnification, a minor quantity of a material composition 1 according to the present invention. The material composition 1 is built up from a large quantity of particles 2 which are each surrounded by a binder layer 3. It should be observed that the size relationship between the binder layer and the particles is not truly to scale, for purposes of clarity. The particles 2, which are surrounded by binder 3, adhere to one another, but in many places leave small air pockets 4 therebetween. Thus, the binder 3 does not constitute a homogeneous, completely unbroken mass. The resultant material composition 1, where the particles 2 take up a relatively large proportion of the total volume, has a lightly granular structure and is simple and pleasant to form and handle.

The particles or grains 2 constitute the major fraction of the material composition 1. Typically, the proportion of particles lies somewhere between 80 and 99.5 vol. % of the finished composition. Preferably, the proportion of particles is about 90 to 98 vol. percent. The large proportion of particles in the material composition 1 implies a considerable cost saving in relation to homogeneous materials, at least if the particles 2 are not excessively expensive. The large proportion of particles 2 in the composition also requires that the binder 3 display good or very good adhesion to the surface of the particles 2.

The mean particle size of the particles or grains 2 lies, in the preferred embodiment, between 0.01 and 1.0 mm, preferably between 0.05 and 0.5 mm, and even more preferably in the range of between 0.07 and 0.15 mm. In practical trials, this particle size has proved to be suitable in order that the total surface area of the particles or grains 2 can be completely covered by the binder 3, without this forming a completely homogeneous whole, which suppresses or erodes the lightly granular structure of the material composition 1. A typical material in the included particles 2 is sand with the above-mentioned mean particle size. However, numerous other particulate materials are conceivable, such as ground marble, polymer grains or balls, cenospheres (from flying ash), microspheres of plastic, ceramics or glass, as well as mixtures of any of these materials. However, the basic criterion is that the particle size be suitable for attaining the above-mentioned binder layer 3.

The particles employed in the preferred embodiment consist of natural sand which contains silicone and is sold under the designation GA39. Another usable particle is SL 150, which consists of so-called cenospheres which are produced together with flying ash in the combustion of coal. They are white or grey in colour and are hollow.

Yet a further particulate material which has been used in practical trials is Mikroperl AF, which consists of completely round, solid glass spheres. A preferred size is 75 to 150 μm. They are transparent, which can be utilised for achieving interesting and attractive aesthetic effects in the finished material composition. The binder 3 which is preferably employed according to the present invention displays extremely good adhesion to such particles, for which reason no surface modification or primer is needed.

In testing of different types of particles, it has been observed that completely round particles increase the doughy property of the composition, which implies that the binder may be made drier and the need for a plasticizer is reduced.

Particles that create purely aesthetic effects, such as mica particles, may be added. Possibly, a surface modification may be needed in order for the binder 3 to adhere thereon.

The binder 3, which differs considerably from that disclosed in the prior art, is such that it may form the above-mentioned layers on the particles 2 with a layer thickness that lies in the order of magnitude of 0.1 to 10 μm, preferably 0.5 to 5 μm and even more preferably 1 to 2 μm. This layer thickness is sufficient to permit an adhering between the particles 2, but still not so great that the interstices between the coated particles 2 run the risk of being completely filled out by the binder 3 so that the granular structure of the material composition 1 is lost. When the particles 2 have finally been covered by the binder 3, it should, as was mentioned above, have such chemical or physical properties that it remains on the particles 2 to a high degree. Otherwise, a surface treatment of the particles may be required.

FIG. 1 shows two coated particles 13, 14 which are in the process of being separated from one another. With the exception of a thin strand 15 of binder 3, the particles 13, 14 will largely be surrounded by the binder 3, i.e. the binder envelopes remain substantially intact. Between two other particles 16, 17 in FIG. 1, a strand 18 of binder has been extended out so far that it has broken. The strand 18 will migrate back to the envelopes on the two particles 16, 17. The longer the strand can become, which depends on the viscosity of binder, the more rubber-like will the material composition 1 become as a whole, and the fewer will be the particles which are separated. As a result, the material composition 1 is perceived as causing less litter.

Another important property in the binder 3 which, after all, has the considerably greatest effect on the tackiness of the finished material composition 1, is that the adhesion to the surroundings should be low, but however with the exception of the particles. By such means, binder residues will not remain either on hands, clothes, moulds, work surfaces or the like when the material composition 1 is handled. In order for the material composition 1 to maintain its integrity and not be far too crumbly, it is important that the binder 3 display a good level of internal adhesion, and is sufficiently soft and pliable so that it maintains it cohesion as an easily handled, non-littering whole.

The finished material composition 1, which includes a binder 3, manufactured from int. al, a hydroxy-terminated polymer, displays a series of advantageous properties. It shows low adhesion to most other surfaces that may occur in its surroundings, with the exception of silicone, and silicone rubber, which despite this is quite uncommon in normal surroundings, for example in a domestic environment or within the child care services. This implies that the material composition 1 does not adhere to and smear on, for example, tables and hands when being used.

On the other hand, the internal adhesion to the material proper is good, which contributes in its internal integrity and its non-crumbling property. The particulate structure of the material composition 1 makes it pleasant to handle and allows for the working and forming or moulding of figures which not have been possible in a composition or matrix consisting exclusively of the binder. In particular, the material composition 1 releases or slips readily from moulds which are employed in figure moulding, even if the moulds are deep.

In the preferred embodiment, the two major ingredients consist of a hydroxy-terminated polymer and a cross-linking agent, with the result that the polymer chains are interconnected so that a binder 3 of higher viscosity than that of the included ingredients is obtained.

The hydroxy-terminated polymer is a polymer whose ends are provided with OH groups. The cross-linking agent, which preferably contains H+ ions, reacts therewith under hydrolysis, i.e. the separation of water. In practical trials that are presented in Table 1, a number of different hydroxy-terminated polymers have been employed. CDS 750 is a hydroxy-terminated silicone oil of a viscosity of 750 cP. H48V750 is another supplier's designation of the same substance. CDS 100 and H48V100, respectively, constitute a hydroxy-terminated silicone oil whose viscosity is 100 cP. Its included polymer chains are shorter and the strands or threads 15, 18 which are formed are shorter before breaking compared with CDS 750 and H48V750, respectively. Many of the properties of CDS 100 and H48V100, respectively, may be considered as superior to those of CDS 750 and H48V750, respectively, for the practical applications under consideration here, but one drawback is that CDS 100/H48V 100 is considerably more expensive.

Even if many hydroxyl-terminated polymers may be employed, it has proved that hydroxyl-terminated silicone oil offers major advantages. On the one hand, a binder 3 will be obtained which has an extremely good internal adhesion, and, on the other hand, it displays very good adhesion to silicone and silicone rubber which may advantageously be employed for surface treatment of the particles 2.

A further ingredient that is advantageously employed in the binder, while not being absolutely necessary, is a hydroxy-containing polymer. Like the hydroxy-terminated polymer, it contains OH groups which may react with the cross-linking agent, but these groups need not be placed at the ends of the molecules. One such polymer which has been employed in practical trials is hydrogenated ricin oil, marketed under the designation Luvotix HT. This polymer is a fatty acid which has one OH group on the 12th carbon atom. Some of its favourable properties are that it binds with pigment that possibly be added, that it is configurationally stable and that it is quite economical. In a combination with CDS 750 as hydroxy-terminated polymer, the positive properties of CDS 100 will be attained at the same time as its drawbacks are reduced or wholly obviated.

In practical trials that are presented in Table 1, use has been made of boric acid, H3BO3, as cross-linking agent. In such instance, particular attention has been paid to the ability of the boric atom to bind three atoms or groups of atoms to itself. Other boric compounds, such as boric acid anhydride B2O3, could serve as cross-linking agent, as well as also other chemicals possessing corresponding properties.

Correspondingly, most polymers which are capable of being cross-linked can be employed in the binder 3, if the cross-linking agent is suitable.

Because of the chemical composition of the binder 3, it is to some degree water-absorbent on lengthy use, for which reason the manufactured figures are not suitable for placing in water, such as in an aquarium. In return however, the material composition 1 gives off water on heating, when the water departs in the form of water vapour or steam, which also strengthens the germicidal effect of the heating operation. Water is given off on heating also because of a hydrolysis in the binder 3 according to the preferred embodiment. Consequently, the material composition is in principle free of water.

The consistency of the material composition 1 is dependent on temperature to but a limited degree, which implies that no softening or heating is needed before the material composition 1 can be used for figure forming or moulding. Nor will the material composition 1 set if it is left unused for a time, since no water evaporates.

As has been mentioned previously, the material composition 1 may advantageously be heated, preferably to about 120° C. in a standard domestic oven. In such instance, any possibly absorbed moisture which might affect the consistency of the material composition will be removed, at least in larger quantities of composition. At the same time, the heating entails that bacteria and other contaminants which might have been passed on to the material composition during use are destroyed. This is particularly important given that the material composition is often used in large children's groups and may be affected by various contaminants which then run the risk of being spread in the children's group. However, by a simple heating process, the material composition is ready to be used once again, and costly rejections are avoided.

Unlike the material composition disclosed in SE 0500663-0, the material composition according to the present invention will not set if it is left unworked after the heating process. This is a clear advantage on heating of larger quantities of the material composition, as, for example, may be case within the child care services, where no time is available to employ personnel in kneading the composition while the heated material composition cools.

Various additives may also optionally be added to the binder 3 in order to improve or vary its properties in some respect. A plasticizer acts as a lubricant between the polymer chains included in the binder, and imparts to the material composition a doughier consistency. In practical trials, use has been made of stearic acid and oleic acid, respectively, as plasticizer. Moreover, the oleic acid is in liquid form at room temperature, which makes possible the addition of this acid to the cooled material composition 1.

Use may advantageously be made when necessary, of Vaseline as a tack-reducing agent which is a highly viscous paraffin oil in the semi-solid phase. Tensides as well as glycols may also be employed for this purpose.

Various pigments may be added in order to modify the colour of the material composition 1. In the practical trials that are presented in Table 1, pigment particles have been employed in numerous cases which are pre-dispersed in a waxy binder (Microlene).

Since the material composition 1 includes a very high proportion of material in particulate or granular form, this implies that it would be difficult, not to say impossible, to use a method where particles 2 are kneaded into the binder 3, which displays quite a high viscosity. It would be quite simply far too difficult to achieve the homogeneous coating of the particles 2 which is sought-for if an attempt is made, starting from the binder 3 of a high viscosity, to knead particles into the binder. Instead, a novel method for realising a material composition 1 has been invented and is shown schematically in FIG. 2.

The method commences with step 5 that the particles 2 which are to be coated with the binder 3 are placed in a standard, simple mixer. A hydroxy-terminated polymer, preferably a hydroxyl-terminated silicone oil, which is a first of two major ingredients in the binder 3 according to the preferred embodiment is added in the next step 6 to the particles 2 in the mixer. At the same time, other optional additives which may improve the final product in some respect, such as for example colour pigment, plasticizer and tack-reducer may possibly be added to the composition. It should, however, be emphasised that such substances are not absolutely necessary for obtaining a functional material composition 1.

The mixer is started and mixing takes place in the next step 7, so that the hydroxy-terminated polymer and possible other optional additives are distributed homogeneously to thin layers on the particles 2. At the same time, heat may be supplied so that the temperature rises, appropriately to about 120° C., which implies that any possible water in the composition may be vaporised and driven off. However, the precondition for this is that the air exchange is sufficient. If, on the other hand, the mixer is (as in the preferred embodiment) of closed type, the water will remain in the mixer in vapour form and an equilibrium will occur with the passage of time where a proportion of the water remains in the material composition 1, while the enclosed air is saturated with steam.

A cross-linking agent, preferably boric acid, which, in the preferred embodiment, is dissolved in water, is added in step 8 in the mixer which is still closed. The boric acid is the second vital ingredient in the material composition 1, since it serves as a cross-linking agent for the hydroxy-terminated polymer and is intended to react with it in order to form the finished, viscous binder 3. However, it is crucial that the boric acid is distributed uniformly in the composition before the reaction takes place, so that the resultant binder 3 will also be homogeneously distributed on the particles 2. Thus, the mixer is closed while the boric acid which is added in step 8 is distributed uniformly in the mixer. In such instance, it should also be observed that the solubility of the boric acid in water increases with the temperature, which implies that it is present in aqueous solution during the distribution in the mixer.

The reaction between the cross-linking agent in the form of boric acid and the hydroxy-terminated polymer is a hydrolysis, which implies that water departs as a reaction product. The water molecules are formed by the hydrogen ions included in the boric acid and the OH groups in the hydroxy-terminated polymer.

When a homogeneous distribution of the boric acid in the material composition 1 has been achieved, this is transferred to a slow mixer for a kneading operation simultaneously with de-airing in step 9. In such instance, steam departs, since the mixer is now open, as well as, heat so that cooling takes place. According as the steam departs and the temperature falls, the boric acid is released and a reaction with the hydroxy-terminated polymer takes place gradually with hydrolysis and homogenously in the material composition. In such instance, the viscosity will gradually increase and a uniform layer of the order of magnitude of 0.1 to 10 μm of the binder 3 occurs on the particles 2. At the same time, as a result of the kneading process, the binder 3 will not be excessively compact, but the desired air pockets 4 will occur between the coated particles 2.

When the composition or matrix is sufficiently cooled, it will be packed and distributed and is immediately ready for use when, in a later step (step 10) it is unpacked. Use of the composition is typically in the form of play and/or therapy.

As has been mentioned previously, the material composition 1 may possibly absorb a minor amount of liquid during use, such as for example saliva or sweat. In such instance, the consistency of the material composition may be affected so that it becomes looser which, in certain contexts, may be perceived as negative. In order to remedy this defect and in order to destroy any possible bacteria or other contaminants which have entered into the material composition 1, this may, after a period of use, be heated up in step 11. The heating operation proper entails the destruction of the contaminants, at the same time as absorbed water in the material composition departs in the form of water vapour or steam. When the material composition has been heated for so long that a temperature of about 120° C. has been reached throughout the entire composition matrix, the material composition is allowed to cool in an additional step 12, the heat being dissipated. No working of the composition during the cooling process is necessary, but instead when it has once again reached room temperature the composition is ready for re-use according to step 10.

DESCRIPTION OF ALTERNATIVE EMBODIMENTS

In the practical application according to the preferred embodiment, sand is the material that functions well as the particulate base. This is in all likelihood because of its surface structure which is not absolutely smooth seen on a microscopic scale. The binder 3 in the hydroxy-terminated polymer that reacts with the cross-linking agent adheres quite well to this substrate despite the limited adhesive power of the binder 3. If particles 2 of a smoother surface structure such as, for example, ceramic materials are employed, the particles or grains 2 included must be surface modified. This is suitably put into effect with an introductory silicone rubber coating which amounts to about 0.02 μm. This surface modification also enjoys the advantage that it entails a reduction of the requirement of added binder in order to realise a material composition 1 possessing the desired properties.

The surface modification has been put into effect in the practical trials on different types of particles with the aid of Wacker fluid L655, which is an aminine-containing low molecular silicone oil which sets on contact with oxygen (air). The surface modification is suitably supplied via the aqueous phase in order to achieve the desired distribution in a thin layer on all particles which are to be treated before the setting begins.

Other substances that may be employed for surface modification are two- or three component silicone rubber or organohalosilanes, such as dimethyl dichlorosilane, (CH3)2SiCl2.

Other substances that may be employed for surface modification are two—or three component silicon rubber or organohalosilanes, such as dimethyl dichlorosilane, (CH3)2SiCl2.

Yet another method of modifying the present invention is that boric acid need not necessarily be dissolved in water in step 8 in the production method. Instead, it is conceivable that the boric acid is dissolved in ethanol, which is more fugitive, and which probably results in a more rapid reaction between the cross-linking agent and the hydroxy-terminated polymer in step 9. However, the use of ethanol involves a fire hazard and may have undesirable environmental consequences.

The cross-linking agent (the boric acid) and the hydroxy-terminated polymer may be added to the particles in the reverse sequence compared with that described in the preferred embodiment. Nevertheless, the major principle remains that the substances be distributed uniformly out on the particles 2 while they are in the low-viscous state. The modification which needs to be made of the method is that the heating takes place only after the addition of the hydroxy-terminated polymer, i.e. only after both of the major ingredients have been added and uniformly spread on the particles 2.

Finally, other binders 3 possessing corresponding viscosity and adhesive properties may be employed in the present invention and the production method is, in such instance, substantially the same. For complete information on such binders 3 as have been tested in practical trials, reference is made to Table 1. The present invention may further be modified without departing from the scope of the appended Claims.

What is claimed is:

1. A material-composition, comprising on the one hand a particulate or granular material and, on the other hand, a binder which is disposed as a coating on the particles or grains, the binder comprising a hydroxyl-terminated polymer cross-linked by a boron compound, wherein the concentration of the particulate or granular material is about 90-98 vol % of the finished composition.

2. The material composition as claimed in claim 1, wherein the hydroxy-terminated polymer is a silicone oil.

3. The material composition as claimed in claim 1, wherein the particles or grains are coated with a surface-modifying agent under the coating of the binder.

4. The material composition as claimed in claim 3, wherein the surface-modifying agent realises a layer of solid silicone.

5. The material composition as claimed in claim 1, wherein the mean particle size of the particulate or granular material is about 0.05-0.5 mm.

6. The material composition as claimed in claim 5, wherein the mean particle size of the particulate or granular material is about 0.07-0.15 mm.

7. A method for the production of a material composition, comprising the steps:
   placing a quantity of particles or grains in a mixer;
   supplying at least a first ingredient included in a binder of the material composition, the first ingredient comprising a hydroxy-terminated polymer of low viscosity, to the mixer;

distributing the first ingredient included in the binder as layers on surfaces of the particles or grains;

thereafter supplying a second ingredient in the form of a boron-containing cross-linking agent to the mixer in dissolved form for cross-linking the layers of the first ingredient.

8. The method as claimed in claim 7, comprising raising the temperature of the composition.

9. The method as claimed in claim 7, comprising surface modifying the particles to improve their adhesion to the binder.

10. The method as claimed in claim 7, comprising kneading and de-airing after the second ingredient has been supplied.

11. The method as claimed in claim 7, wherein the first ingredient is a hydroxy-terminated silicone oil.

12. The material composition as claimed in claim 2, wherein the particles or grains are coated with a surface-modifying agent under the coating of the binder.

13. The material composition as claimed in claim 3, wherein the surface-modifying agent realises a layer of solid silicone.

14. The material composition as claimed in claim 2, wherein the mean particle size of the particulate or granular material is about 0.05-0.5 mm.

15. The material composition as claimed in claim 14, wherein the mean particle size of the particulate or granular material is about 0.07-0.15 mm.

16. The method as claimed in claim 8, comprising surface modifying the particles to improve their adhesion to the binder.

17. The method as claimed in claim 8, comprising kneading and de-airing after the second ingredient has been supplied.

18. The method as claimed in claim 8, wherein the first ingredient is a hydroxy-terminated silicone oil.

* * * * *